W. W. ANNABLE.
AUTOMATIC CLUTCH.
APPLICATION FILED AUG. 22, 1913.

1,114,716.

Patented Oct. 27, 1914.

Witnesses
Harold O. Van Antwerp
Mae Rankin

Inventor
Warren W. Annable
By Luther V. Moulton
Attorney.

UNITED STATES PATENT OFFICE.

WARREN W. ANNABLE, OF GRAND RAPIDS, MICHIGAN, ASSIGNOR OF ONE-TENTH TO DANIEL W. TOWER, OF GRAND RAPIDS, MICHIGAN.

AUTOMATIC CLUTCH.

1,114,716.   Specification of Letters Patent.   Patented Oct. 27, 1914.

Application filed August 22, 1913. Serial No. 786,105.

*To all whom it may concern:*

Be it known that I, WARREN W. ANNABLE, a citizen of the United States of America, residing at Grand Rapids, in the county of Kent and State of Michigan, have invented certain new and useful Improvements in Automatic Clutches; and I do hereby declare the following to be a full, clear, and exact description of the invention, such as will enable others skilled in the art to which it appertains to make and use the same.

My invention relates to improvements in automatic clutches, and more particularly to such clutches adapted to be applied to and used in connection with starting devices for internal combustion engines, and its object is to provide a clutch, which, when attached to the rotatable shaft of the starting device, will when such shaft is rotated, automatically clutch the crank shaft of the engine, whereby the same may be rotated and will automatically release the same when the engine starts its rotation, to provide a device which will be simple in construction and effective in operation, and to provide the same with certain other new and useful features hereinafter more fully described and particularly pointed out in the claims, reference being had to the accompanying drawings, in which:—

Figure 1:
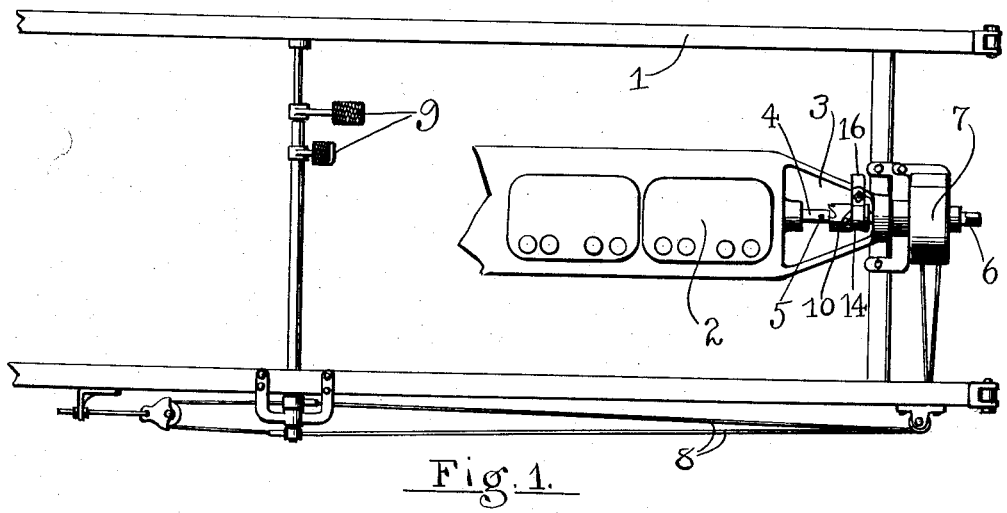
Figure 2:
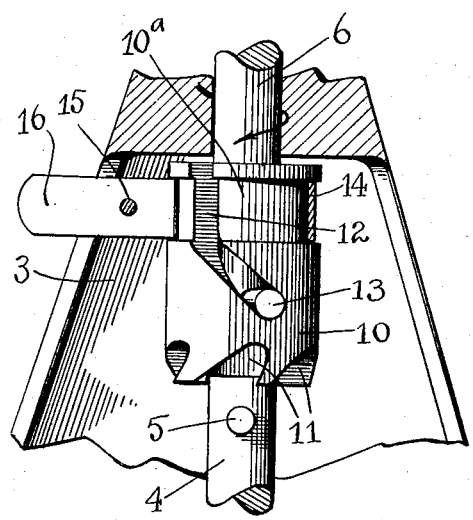
Figure 3:
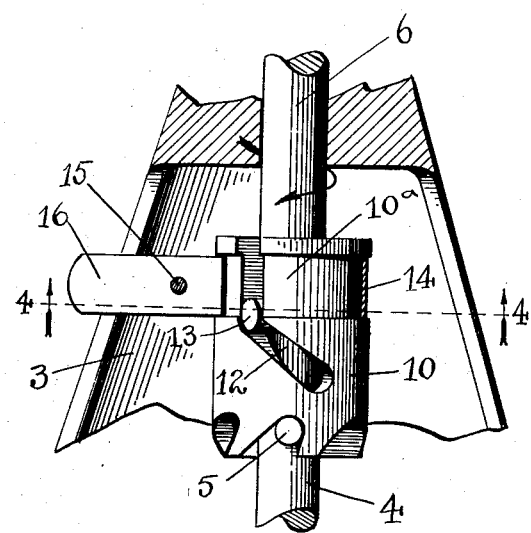
Figure 4:
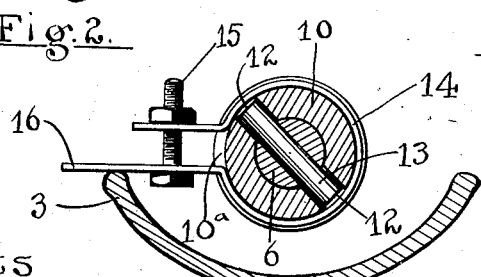

Figure 1 is a plan view of a portion of the frame of an automobile with an engine mounted thereon and an engine starter provided with my improved clutch in operative position; Fig. 2 is an enlarged plan view of the clutch and adjacent co-acting parts of the starter and engine with parts broken away, said clutch being shown in disengaged position; Fig. 3 shows the same parts as Fig. 2 with the clutch moved to engaged position; and Fig. 4 is a transverse vertical section on the line 4—4 of Fig. 3.

Like numbers refer to like parts in all of the figures.

1 represents the frame of an automobile having an engine 2 mounted therein, such engine being connected to the cross member at the front of the frame by an extension 3 on its base.

4 is the crank shaft of the engine which projects through the base and is provided with a clutch pin 5 near its forward end.

6 is the starter shaft located in line with the engine shaft 4 and adapted to be rotated by means of mechanism within the case 7 in which the shaft is journaled, said mechanism being operated by means of cables 8 and foot pedals 9, this mechanism, however, forming no part of the present invention.

A clutch sleeve 10 is slidably mounted on the inner end of the starter shaft 6 adjacent to the end of the engine shaft and is provided at its inner end with jaws 11 adapted to engage the pin 5 on the engine shaft. This clutch sleeve 10 is provided on diametrically opposite sides with slots 12, said slots commencing at the end of the sleeve farthest from the crank shaft of the engine and extending a short distance longitudinally of the axis of the sleeve, and thence turning and extending spirally of the said sleeve for a short distance. A pin 13 passes through the shaft 6, and its ends project into the slots 12 in the sleeve and are adapted to traverse the said slots. The sleeve is provided with an annular groove 10$^a$, and a friction brake consisting of a band of metal 14 bent around the sleeve in this groove and having its ends turned outward and bolted together as at 15, one of said ends being extended to form a lever 16 which engages the stationary engine frame 3 to prevent the rotation of the brake. This brake yieldably holds the clutch sleeve 10 non-rotative, but does not interfere with its longitudinal movement as the lever arm 16 is free to slide upon the engine frame 3.

The operation of the device is as follows: Assuming the clutch sleeve 10 to be in disengaged position as shown in Fig. 2 with the pin 13 at the end of the spiral portion of the slot 12 in which position the sleeve 10 is moved forward on the shaft 6 and away from the pin 5 on the engine shaft 4. The starter shaft 6 is rotated by means of the mechanism above referred to in the direction indicated by the arrow on the drawings which moves the pin 13 in the spiral portion of the slot 12 in the sleeve 10, owing to the fact that this sleeve is prevented from rotating by the friction brake 14. This movement of the pin 13 has a cam action which slides the sleeve 10 longitudinally upon the shaft 6 until the jaws at its end engage the clutch pin 5 on the engine shaft. The proportions of the slot 12 are so arranged that when this has taken place the pin 13 will have reached the longitudinal portion of the said slot and the cam action ceases, and further rotation of the shaft 6 tends to rotate the sleeve 10, together with the engine shaft slipping the friction brake 14 upon the sleeve.

When the engine starts and commences to rotate faster than the starting shaft the sleeve 10 will be correspondingly rotated and moved faster than the starting shaft, thus causing the pin to re-traverse the spiral portion of the slot and move the clutch sleeve out of engagement with the clutch pin 5, thus releasing the clutch and disconnecting the two shafts.

While I have shown and described this clutch as used in connection with a starter for internal combustion engines I do not care to limit its use to this particular type of mechanism as the clutch is equally operative and useful whenever it is desirable to automatically connect two rotating members, one of which is to be driven by the other.

What I claim is:

1. An automatic clutch, comprising a driven clutch member, a driving shaft, a driving clutch member surrounding said driving shaft and movable thereon and having a spiral slot terminating in a longitudinal end, a pin projecting from said driving shaft into said slot and adapted to traverse the same to move the driving clutch member longitudinally on the shaft and to engage the longitudinal end of the slot to rotate the said member, and a friction brake engaging the driving clutch member.

2. An automatic clutch, comprising a driven clutch member, a driving shaft, a driving clutch surrounding said driving shaft and movable thereon and having a spiral slot, a pin projecting from said driving shaft into said slot and adapted to traverse the same to move the driving clutch member longitudinally and to engage one end of the slot to rotate the clutch member, and a friction brake comprising a brake band surrounding the clutch member and a lateral arm to hold the band from rotating.

In testimony whereof I affix my signature in presence of two witnesses.

WARREN W. ANNABLE.

Witnesses:
 HAROLD O. VAN ANTWERP,
 LUTHER V. MOULTON.